(12) United States Patent
Croyle et al.

(10) Patent No.: US 7,870,319 B2
(45) Date of Patent: Jan. 11, 2011

(54) COMMUNICATION INTERFACE FOR AN ELECTRONIC DEVICE

(75) Inventors: Richard Lancaster Croyle, Surrey (GB); Simon Cox, Hampshire (GB); Neil Briffett, Surrey (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/462,860

(22) Filed: Aug. 11, 2009

(65) Prior Publication Data
US 2009/0307381 A1 Dec. 10, 2009

Related U.S. Application Data

(63) Continuation of application No. 10/473,846, filed on Feb. 23, 2004, now Pat. No. 7,627,704.

(30) Foreign Application Priority Data

Apr. 30, 2001 (GB) .................................. 0110565.9

(51) Int. Cl.
*G06F 13/42* (2006.01)
*G06F 13/00* (2006.01)
*G06F 3/00* (2006.01)
*G06F 13/14* (2006.01)

(52) U.S. Cl. .................. 710/105; 710/11; 710/104; 710/305

(58) Field of Classification Search .................. 710/8, 710/10–12, 62, 65, 72, 104–105, 300–305, 710/311, 313, 316
See application file for complete search history.

(56) References Cited

U.S. PATENT DOCUMENTS

| 4,972,470 A | 11/1990 | Farago ........................ 713/192 |
| 5,594,874 A | 1/1997 | Narayanan et al. .......... 395/284 |
| 5,715,409 A | 2/1998 | Bucher et al. ................ 395/309 |
| 5,715,449 A | 2/1998 | Peters, Jr. et al. ........... 395/613 |
| 5,832,244 A | 11/1998 | Jolley et al. .................. 395/309 |
| 5,935,224 A | 8/1999 | Svancarek et al. ............. 710/63 |
| 5,961,351 A | 10/1999 | Wu ............................. 439/610 |
| 6,009,480 A | 12/1999 | Pleso ............................ 710/8 |
| 6,243,776 B1 | 6/2001 | Lattimore et al. ........... 710/104 |
| 6,334,160 B1 | 12/2001 | Emmert et al. ................ 710/11 |
| 6,442,734 B1 | 8/2002 | Hanson et al. ................. 716/4 |
| 6,763,408 B1 | 7/2004 | Sonoda ........................ 710/73 |

(Continued)

FOREIGN PATENT DOCUMENTS

DE 19916119 A1 12/1999

(Continued)

OTHER PUBLICATIONS

Patent Abstracts Of Japan, Publication No. 2001-306495, "Portable Communication Terminal", 1 page, Nov. 2, 2001.

(Continued)

*Primary Examiner*—Thomas J Cleary
(74) *Attorney, Agent, or Firm*—Harrington & Smith (57) ABSTRACT

A mobile telephone handset is provided with a connector (8) and circuitry (18, 19) which permits universal serial bus (USB) and single-ended (SE) modes of data transmission with another device such as a personal computer, another mobile telephone handset or keyboard.

19 Claims, 4 Drawing Sheets

U.S. PATENT DOCUMENTS

| | | | |
|---|---|---|---|
| 6,772,253 B1 | 8/2004 | Slaight et al. | 710/105 |
| 6,836,814 B2 | 12/2004 | Takaoka et al. | 710/316 |

FOREIGN PATENT DOCUMENTS

| | | |
|---|---|---|
| GB | 2344429 A | 6/2000 |
| GB | 2351421 A | 12/2000 |
| WO | WO-01/25943 A1 | 4/2001 |

OTHER PUBLICATIONS

Patent Abstracts Of Japan, Publication No. 2001-067159, "Interface Switching Device", 1 page, Mar. 16, 2001.

'EIA-232'. The Free On-Line Dictionary of Computing. Online Dec. 28, 1998. Retrieved from Internet Oct. 4, 2006. http://foldoc.org/foldoc.cgi?query=rs232.

'RS-232'- Wikipedia, The Free Encyclopedia. Online Feb. 25, 2002. Retrieved from Internet Oct. 4, 2006. http://wikipedia.org/w/index.php?title=RS-232&oldid-161461.

'RS-232C'. Webopedia.com. Online Oct. 12, 1997. Retrieved from Internet Oct. 5, 2006. http://web.archive.org/web/20021015124703/http://www.webopedia.com/TERM/R/RS_232C/html.

'Full-duplex' in The Free On-Line Dictionary of Computing. Online Jul. 21, 2001. Retrieved from Internet Jan. 24, 2006. http://foldoc.org/?query=full+duplex.

'ASIC' and 'gate array' in "The Microsoft Press Computer Dictionary". Second Edition. 1994. Microsoft Press. pp. 28 and 182. ISBN 1-55615-597-2.

"Universal Serial Bus". Leroy's Engineering Web Site. Online Feb. 3, 2003. Retrieved from Internet Archive Mar. 23, 2007. http://web.archive.org/web/20020209130118/http://www.interfaceBus.com/Design_Connector_USB.htlm.

'Half-duplex' in "The Free On-Line Dictionary of Computing". Online Jul. 21, 2001. Retrieved from Internet Mar. 23, 2007. http://foldoc.org/index.cgi?query=half+duplex.

'Double-duplex' in "The Free On-Line Dictionary of Computing". Online Mar. 30, 2000. Retrieved from Internet Mar. 23, 2007. http://foldoc.org/index.cgi?query=double-duplex.

COMMUNICATION INTERFACE FOR AN ELECTRONIC DEVICE

CROSS REFERENCE TO RELATED APPLICATION

This is a continuation patent application of U.S. patent application Ser. No. 10/473,846 filed on Feb. 23, 2004.

FIELD OF THE INVENTION

The present invention relates to a communication interface for permitting an electronic device to be in communication with another electronic device using first or second data transmission modes.

BACKGROUND ART

A Universal Serial Bus (USB) standard has been developed which allows up to 127 peripheral devices such as printers, scanners, keyboards, modems, cameras and storage devices to be attached to a host, usually a personal computer (PC), through a 4-wire bus. These devices can be connected to the PC either directly or via hubs which provide additional connections. USB has the advantage that connection of different types of devices becomes standardised. Furthermore, a device can be connected while the PC is switched on and while other devices are in use. USB can support data rates as high as 480 Mbps. An overview of USB may be found in "USB Hardware & Software" by J. Garney et al. (Anna Books, 1998) [ISBN 0-929392-3-X] and a current version of the USB specification is available at www.usb.org or from USB-IF Administration, 5440 SW Westgate Drive, Suite 217, Portland, Oreg. 97221 USA.

Mobile telephone handsets are being introduced which support USB. A USB interface allows them to be connected to a PC or a peripheral device. In this way, a handset may serve as a peripheral device or a host. Although such a handset will enjoy many of the advantages of USB, there are, however, some drawbacks. Simple peripheral devices for connecting to the handset are made unnecessarily complex and expensive since they themselves must support USB. Furthermore, once connected, these devices draw a high current from the handset, which has limited power resources.

Mobile telephone handsets are known which have simple serial communications interfaces based on the RS-232 standard and which use single-ended data transmission. This allows them to be connected to peripheral devices such as keyboards for entering text for short message service (SMS) and e-mail. These types of interfaces draw much less current and so are better suited to low power applications.

To overcome the drawbacks of having a USB interface, both types of interface may be included in a single handset. However, this is not practical for a small handset. Furthermore, this defeats the object of providing a standardised connector.

The present invention seeks to provide a solution to this problem.

DISCLOSURE OF THE INVENTION

According to the present invention there is provided a communication interface for permitting an electronic device to be in communication with another electronic device using first or second data transmission modes, the interface comprising first communication means for communication using said first mode, second communication means for communication using said second mode and switching means for selectively connecting the first and second communication means to a common transmission path.

The first mode of data transmission may comprise serial transmission of data, such as single-ended data transmission.

The second mode of data transmission may comprise serial transmission of data, such as differential transmission of data and may conform to a universal serial bus (USB) specification.

The interface may comprise first and second input/output data lines. The first and second input/output lines may be used to transmit and receive data using the second mode of data transmission. The first input/output data line may be used to receive data and said second input/output data line may be used to transmit data using said first mode of data transmission. The first input/output line may be used to receive and transmit data using said first mode of data transmission. The second input/output line may be used to receive and transmit data using said first mode of data transmission. The first and second input/output data lines may comprise D+ and D− lines respectively. The first and second input/output lines may be connectable to a data bus.

The interface may further comprise a connector for receiving a data bus, which may conform to the USB specification.

The first mode of data transmission may use a first set of voltage levels, while the second mode of data transmission may use a second, different set of voltage levels. The switching means may comprise means for shifting the first or second set of voltage levels to another set of voltage level.

The interface may further comprise means for determining the mode of data transmission on said common transmission path.

The means for determining the mode of data transmission may comprise means for sensing a status line. The means for determining the mode of data transmission may comprise means for detecting a power supply line.

The first communication means may be configured for full- or half-duplex communication The interface may be incorporated into the electronic device.

According to the present invention there is also provided an electronic device including an interface.

According to the present invention there is also provided an electronic device including an interface. The electronic device may be portable and may be a mobile telephone handset, a personal digital assistant or a mobile communicator, a digital camera, an MP3 player or a handheld gaming system.

BRIEF DESCRIPTION OF THE DRAWINGS

An embodiment of the present invention will now be described, by way of example, with reference to the accompanying drawings in which:—

BEST MODE FOR CARRYING OUT THE INVENTION

Figure 1:
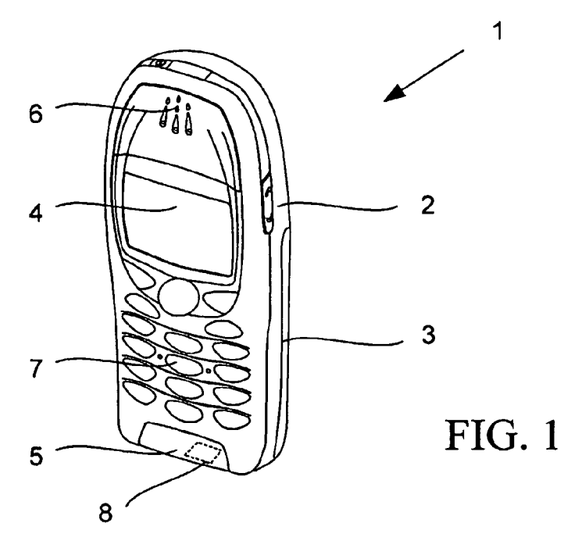
FIG. 1 is a perspective view of a mobile telephone handset.
Figure 2:
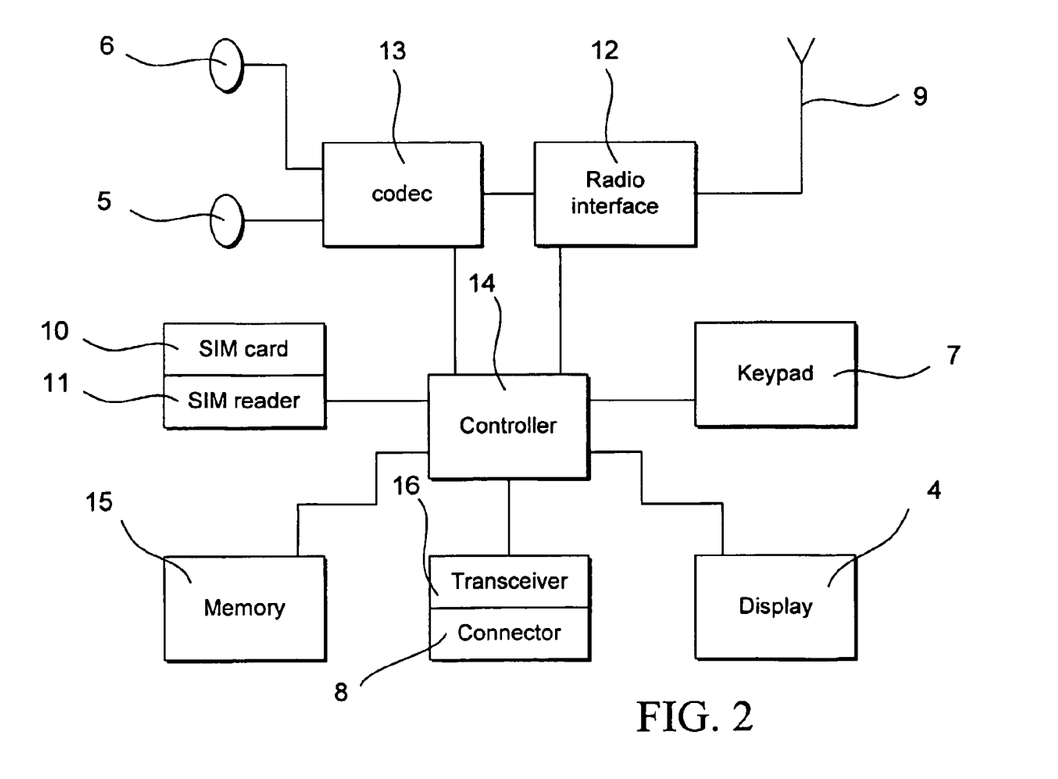
FIG. 2 is a schematic diagram of mobile telephone circuitry.

Referring to FIGS. 1 and 2, a mobile telephone handset 1 comprises a casing 2, a battery pack 3, liquid crystal display (LCD) panel 4, a microphone 5, an earpiece 6, keypad 7, a connector 8, antenna 9, subscriber identification module (SIM) card 10 and SIM card reader 11. Mobile telephone circuitry includes radio interface circuitry 12, codec circuitry 13, controller 14, memory 15 and input/output (I/O) transceiver circuitry 16. The I/O transceiver circuitry 16 allows single-ended (SE) and USB modes of serial data transmission.

Figure 3:
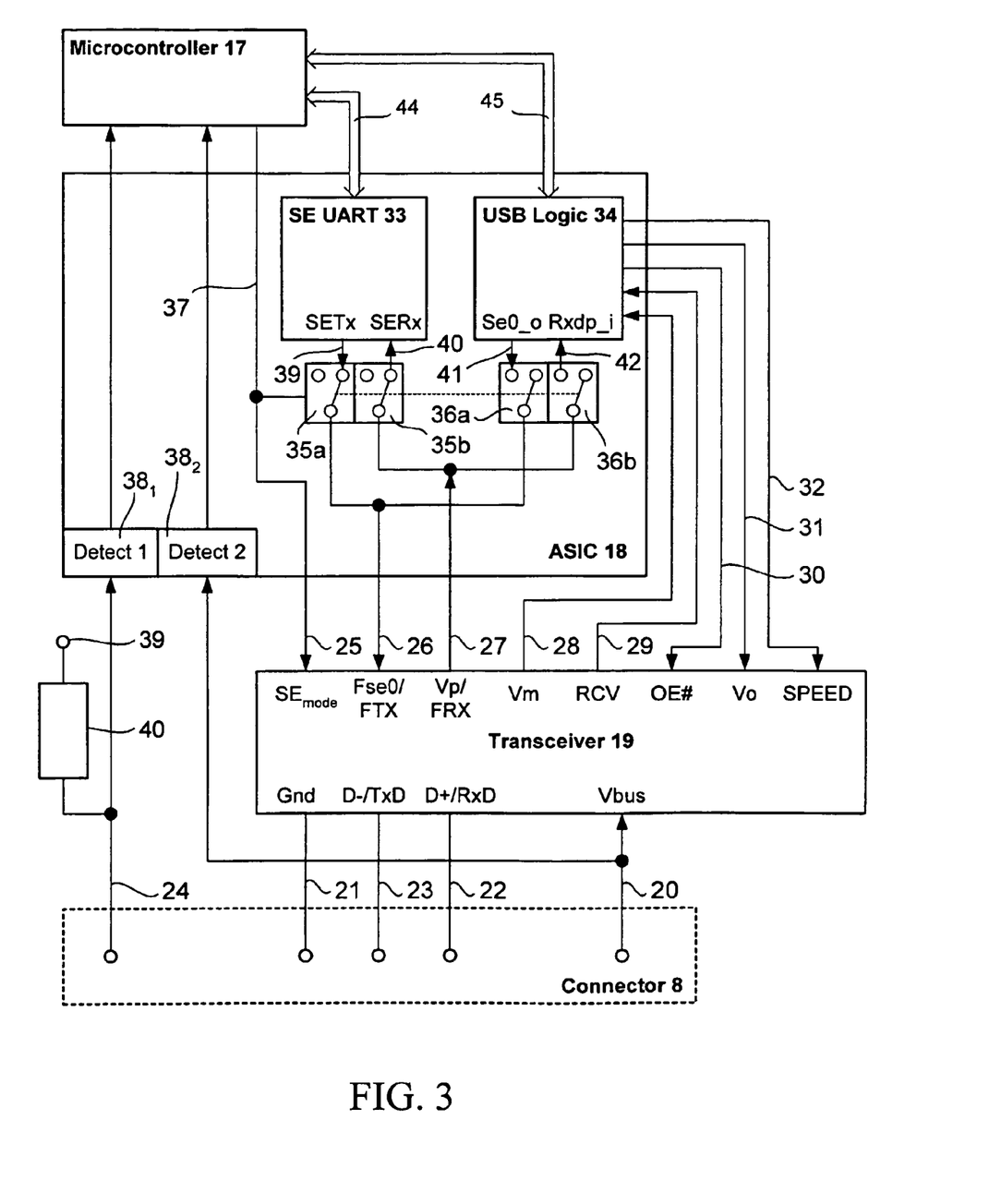
FIG. 3 is a schematic diagram of serial input/output circuitry.

Referring to FIG. 3, the I/O transceiver circuitry 16 includes a microcontroller unit (MCU) 17, a system application specific integrated circuit (ASIC) 18 and a transceiver circuit 19. In this example, the connector 8 is suitable for connecting the handset 1 to a USB host (not shown) and conforms to the USB specification. It will be appreciated that a so-called 'B'-type plug may be used on the end of a connecting cable to connect the handset 1 to a USB peripheral device. The connector 8 is also suitable for connecting the handset 1 to other types of peripheral device (not shown) which use SE modes of data transmission. A mode of data transmission refers to an arrangement for transferring data between two entities, such as devices or circuits, and which may include hardware and software. The connector 8 is a USB port having power (Vbus) and ground (GND) lines 20, 21 and a pair of data lines 22, 23 referred to as D+/RxD and D−/TxD. The connector 8 also has a status line (Id) 24 for determining the mode of data transmission between the handset 1 and an attached device (not shown). The power, ground and data lines 20, 21, 22, 23 feed into the transceiver circuit 19.

The transceiver circuit 19 can operate in two transmission modes, namely USB and SE transmission modes. Each transmission mode has its advantages. USB transmission uses a differential data transmission scheme which is used to achieve good noise rejection especially at high data rates. Meanwhile, SE transmission, unlike USB transmission, does not have strict timing requirements. Furthermore, SE transmission does not require a peripheral device, such as a keyboard (FIG. 5) to have or be provided with a 5-volt power source.

The transceiver circuit 19 serves as an interface between the system ASIC 18 and a data bus (not shown) connected to the connector 8. The transceiver circuit 19 level shifts and conditions data and so allows the handset 1 to be used with peripheral devices having either type of interface. For example, level shifting may include converting signals between relatively low voltages used by the ASIC 18 and relatively high voltages used for USB transmission, while signal conditioning may include setting rise and fall times on the D+/RxD and D−/TxD lines 22, 23.

The transceiver circuit 19 can be switched into USB transmission mode by applying a binary '0' signal to a SE mode line 25 and into SE transmission mode by applying a '1'. The transceiver circuit 19 supports first and second data paths (Fse0/FTX, Vp/FRX) 26, 27 for receiving and transmitting data to and from the system ASIC 18. The relationship between the Fse0/FTX and Vp/FRX data paths 26, 27 and the D+/RxD and D−/TxD 22, 23 will be described in more detail later.

The transceiver circuit 19 is also provided with a plurality of USB-specific data and control lines. These include a received data line Vm 28 which provides a path for data received over the D−/TxD line 23, a differential received data line RCV 29, a transmit/receive control line OE#30 for controlling whether data is transmitted or received, a transmit data line Vo 31 and a speed control line SPEED 32 which selects a transmitted data slew rate. In this example, the transmitted data slew rate may be between 4 and 20 ns or between 75 and 300 ns.

The system ASIC 18 includes a single-ended universal asynchronous receiver/transmitter circuit (SE UART) 33 and Universal Serial Bus (USB) logic circuit 34. The USB logic circuit 34 encodes and decodes USB data commands. The Fse0/FTX and Vp/FRX data paths 26, 27 are switched between the SE UART and the USB logic circuits 33, 34 by first and second pairs of switches 35a, 35b, 36a, 36b respectively controlled by a control line 37 from the MCU 17. The control line 37 also provides the signal through the SE mode line 25. The system ASIC 18 also includes a first detection circuit $38_1$ which measures the resistance of the status line Id 24 on the connector 8 to determine the type of data transmission used by an attached device (not shown). The status line Id 24 is connected to a handset power supply 39, for example battery 3, through a weak pull-up resistor 40. In this example, the resistor 40 has a value of 220 kΩ. It will be appreciated that instead of measuring resistance, a signalling scheme may also be used. The system ASIC 18 may include a second detection circuit $38_2$ which is connected to Vbus power line 23. The detection circuits 38 report to the MCU 17, which is thus able to determine the mode of data transmission.

The SE UART circuit 33 has SETx line 39 for transmitting data to the attached device (not shown) and a SERx line 40 for receiving data from the attached device (not shown).

The USB logic circuit 34 has a Se0_o line 43 for applying a signalling state SE0 to the Fse0/FTX line 26 so as to cause D+/RxD and D−/TxD lines 22, 23 to be driven at 0 volts and a Rxdp_i line 42 for detecting received D+ data.

The SE UART and USB logic circuits 33, 34 exchange command and transmission data with the MCU 17 by means of first and second buses 44, 45.

It will be appreciated that the transceiver circuit 19 may be modified, for example it may be provided with different data and control lines configurations. For example, the Fse0/FTX data line 26 and the transmit data line Vo 31 may be replaced by a Fse0 line and a Vo/FTX line respectively. As a result, the Fse0 lines serves a single function, namely to apply the SE0 signalling state in USB mode as described above. The Vo/FTX line has a dual function, namely to provide a transmit data line Vo as described above or a conventional TxD SE line as described below. This configuration requires modification of the ASIC 18, especially the switches 35, 36. Consequently, the Se0_o line 41 is permanently connected to the Fse0 line. The Vo/FTX line is connected to SETx line 39 of the UART 33 through the switch 35a and also to a TxD_o line (not shown) of the USB logic circuit 34 through a switch (not shown) which is controlled by the control line 37.

Figure 4:
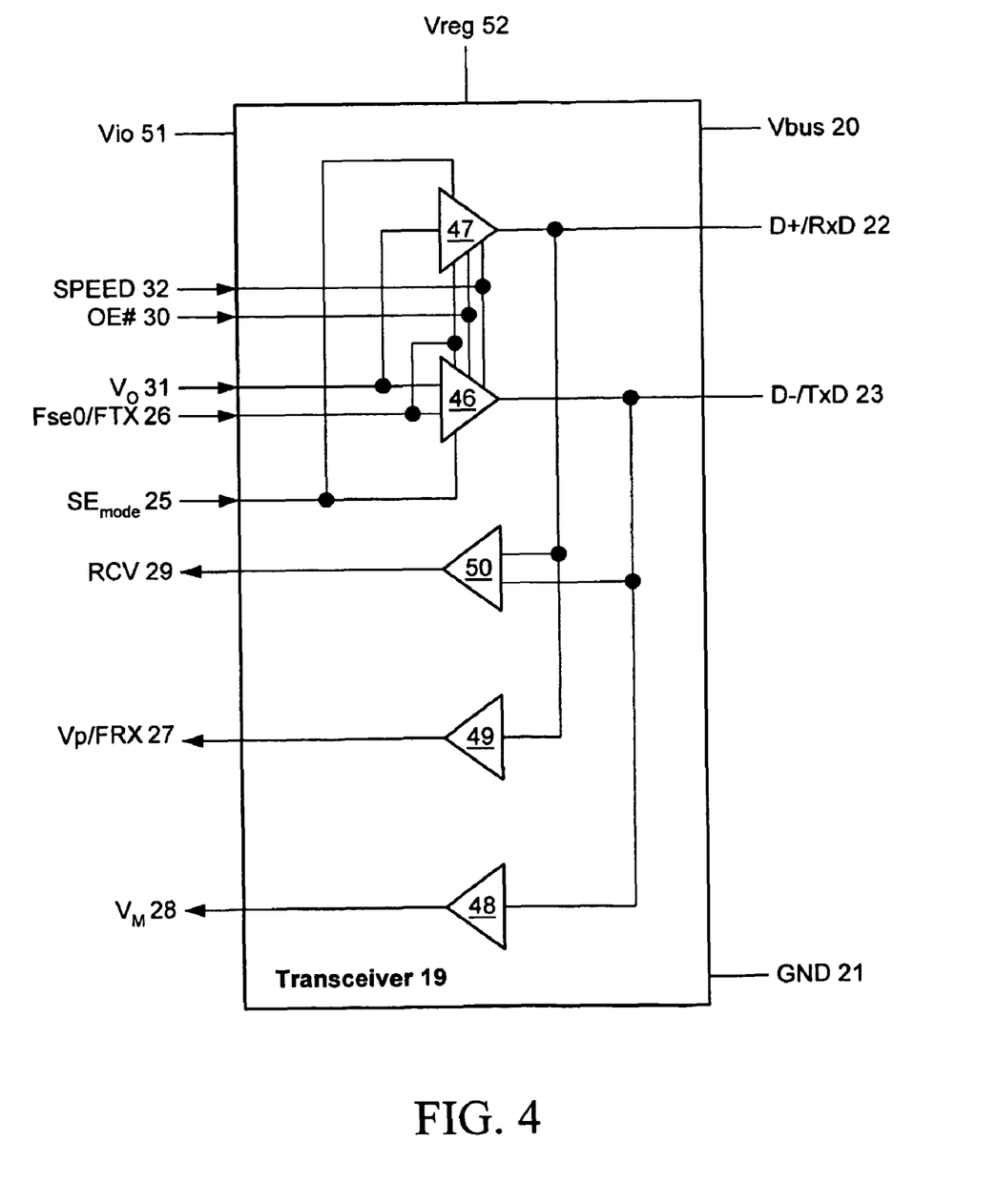
FIG. 4 is a schematic diagram of transceiver circuitry.

Referring to FIG. 4, the transceiver circuit 19 exchanges signals with the system ASIC 19 at voltages Vio. The transceiver circuit 19 exchanges signals with an attached device (not shown), when in USB mode, at a nominal voltage of 3.3V, and, when in SE mode, at a voltage of Vreg. In this example, Vio<3.3V and Vio<Vreg. Thus, the transceiver circuit 19 level shifts signals between the ASIC 19 and the attached device (not shown).

The transceiver circuit 19 comprises first and second output means 46, 47. The transmit/receive control line OE#30 enables the output means 46, 47 to transmit data, while the speed control line 32 determines the slew rate of the transmitted data.

In USB mode, the first output means 46 is supplied with transmission data from the USB transmit line Vo 31 from the USB logic circuit 34 and with a signal SE0 along the first data path Fse0/FTX 26. The second output means 47 is also supplied with transmission data from the USB transmit line Vo 31. The signal SE0 is used to control the first and second output means 46, 47 so as to drive D+=D−=0V. Thus, the D+/RxD and D−/TxD lines 22, 23 operate as D+ and D− respectively as conventional USB data lines.

In SE mode, the first output means 46 is supplied with transmission data from the first data path Fse0/FTX 26 from the SE UART 33. The signal SE mode 25 is used to switch the first and second output means 46, 47 into SE mode. Thus, the D−/TxD line 23 operates as TxD as a conventional SE line.

The transceiver 19 further comprises first, second and third input means 48, 49, 50.

In USB mode, the first input means 48 is supplied with received data from the D−/TxD line 23. It supplies the data to the USB logic 34 circuit using received data line Vm 28. Similarly, the second input means 49 is supplied with received data from the D+/RxD line 22. Again it passes the data to the USB logic circuit 34 using the second data line Vp/FRX 27. The third input means 50 receives data from both D+/RxD line 22 and D−/TxD line 23 and supplies a differential received data signal RCV to the USB logic circuit 34.

In SE mode, the second input means 49 is supplied with received data from the D+/RxD line 22. It supplies the data to the SE UART circuit 33 using second data line Vp/FRX 27.

In addition to switching data, the input and output means 48, 49, 50, 46, 47 also perform level shifting and signal conditioning on data received and transmitted to and from the attached device (not shown).

For shifting voltage levels of the received and transmitted signals, the transceiver circuit 19 is provided with voltage reference sources. While the handset is powered, the circuit 19 is continuously provided with a source Vio 51, while a source Vref 52 is controlled by the MCU 17. Vbus 20 is provided through the connector 8. Thus, in SE mode, the transceiver circuit 19 is supplied with voltage sources Vio 51 and Vreg 52, while in USB mode, it is provided with voltages sources Vio 51 and Vbus 20.

SE and USB modes of transmission will now be described.

Figure 5:
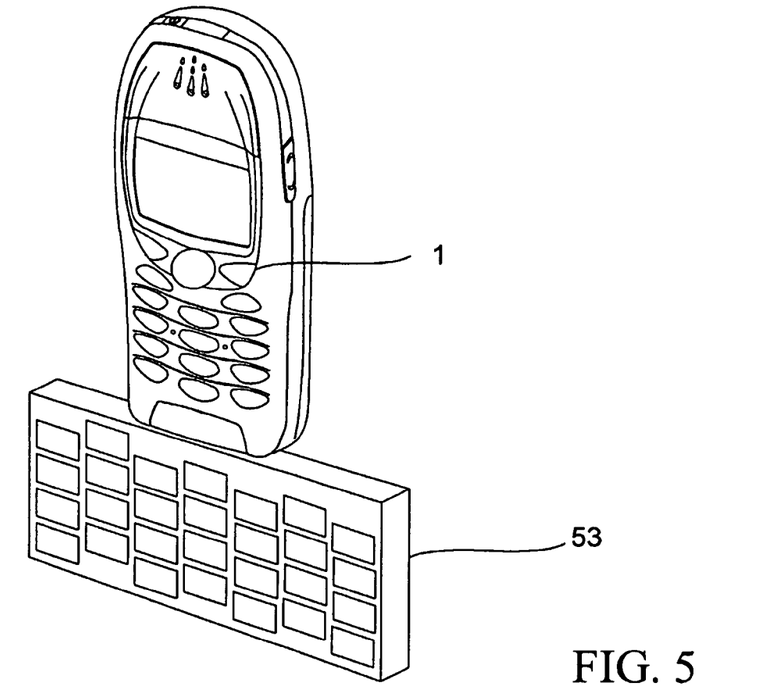
FIG. 5 shows connection of a keyboard to a mobile telephone using single-ended data transmission and FIG. 6 shows connection of a personal computer to a mobile telephone handset using bi-directional, differential data transmission.

Referring to FIGS. 3 and 5, a keyboard 53 which communicates according to RS-232 standard is connected to the handset 1 using the connector 8. The keyboard 53 has a resistor (not shown) which connects the status line 24 to ground. This is measured by the first detection circuit $38_1$ and so the MCU 17 determines that the keyboard 53 is a simple peripheral device operating according to the single-ended transmission mode. The controller 17 applies a '1' to the control line 37, which switches the transceiver 19 to SE transmission mode. The high signal on the control line 37 switches the data paths 26, 27 to the SETx and SERx lines 39, 40 respectively of the SE UART 33. As a result the D+ line 22 of the connector 8 is driven as a receive (Rx) line, while the D− line 23 of the connector 8 is driven as a transmit (Tx) line.

Figure 6:
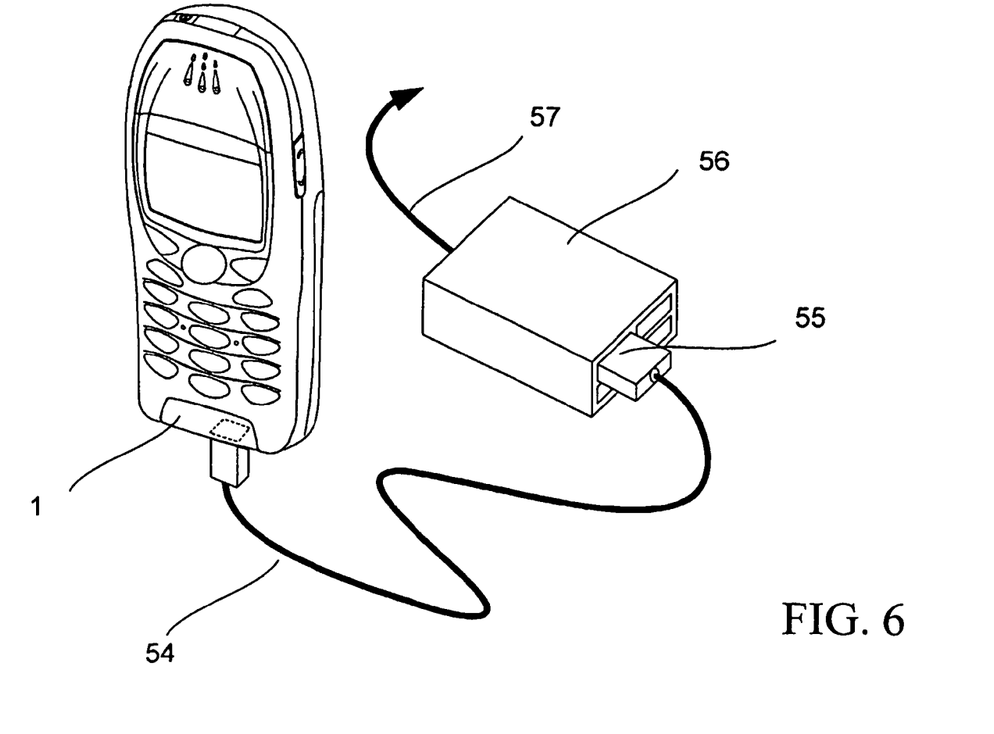

Referring to FIGS. 3 and 6, the handset 1 is connected using a USB cable 54 to a port 55 of a USB hub 56. The hub 56 is connected to a personal computer (not shown) by a cable 57. The status line 24 is unconnected and left to float at Vio. The second detection circuit $38_2$ detects Vbus and so the microcontroller 17 determines that the handset 1 is connected to a USB host and should therefore operate according to USB transmission mode. The controller 17 applies a '0' to the control line 37, which switches the transceiver 19 to USB transmission mode. The low signal on the control line 37 switches the data paths 26, 27 to the Se0_o and Rxdp_i lines 39, 40 respectively of the USB logic circuit 34. As a result the D+ and D− lines 22, 23 are used in conventional USB transmission mode. It will be appreciated that the handset 1 can be connected directly to a personal computer.

This has the advantage that a USB interface can be used and still have backward compatibility with systems which operate according to SE transmission. There is no need to provide additional pins or connectors.

In the example hereinbefore described, in SE mode, one line 22 is used for Rx and the other line 23 is employed for Tx. This allows the handset 1 to transmit and receive signals simultaneously with another device, i.e. full-duplex communication. However, one or both lines 22, 23 may be configured for half-duplex operation with one or more devices. For example, if each line 22, 23 is used for both transmitting and receiving in SE mode, i.e. half-duplex communication, then they can be used independently of one another and so permit the handset 1 to communicate with two other devices. The lines 22, 23 may be used for half-duplex communication with the same device. During half-duplex communication, the lines 22, 23 may transmit signals from the handset 1 at the same or different times.

It will be appreciated that many modifications may be made to the embodiment hereinbefore described. Many types of portable digital equipment may be used instead of a mobile telephone handset, such as a personal digital assistant, a digital camera, an MP3 player or a portable gaming system. The host need not be personal computer but may be, for example, a games console such as Sony Playstation 2 or Microsoft X-box. The MCU and/or the transceiver circuit may be integrated into the system ASIC. Different signals may be used to switch the transceiver circuit between USB and SE modes. For example, the transceiver circuit can be switched into USB mode by application of a '1' to the SE mode line and into SE mode by use of a '0'. Alternatively, a more complicated signalling arrangement using data bus communication may be used.

The invention claimed is:

1. A communication interface comprising:
    a USB port configured to be able to receive a data bus of an electronic device to be connected to the communication interface, the USB port including:
        a power Vbus line;
        a data transmission mode status line;
        a ground line; and
        a first and second data line for receiving data from an electronic device connected to the interface via the USB port,
    wherein the first and second data lines form part of a common transmission path for enabling an electronic device connected to the USB port to be in communication with a further electronic device using either:
    a first data transmission mode, comprising single-ended asynchronous data transmission; or
    a second data transmission mode, comprising USB differential transmission of data;
    first communication circuitry configured to allow for communication between a connected electronic device and a further electronic device using said first data transmission mode;
    second communication circuitry configured to allow for communication between a connected electronic device and a further electronic device using said second data transmission mode;
    first detection circuitry configured to detect the data transmission mode status of a connected electronic device using the data transmission mode status line of the USB port;

second detection circuitry configured to detect the power activity of a connected electronic device using the power Vbus line of the USB port; and switching circuitry configured to selectively connect the first or second communication circuitry to the common transmission path to allow for data transmission between a connected electronic device and a further electronic device in either the first or second data transmission mode using the same interface based on the first and second detection circuitries, wherein the switching circuitry is configured to selectively connect said first or second communication circuitry by:

identifying the data transmission mode status of the connected electronic device using the first detection circuitry;

identifying the power activity of the connected electronic device using the second detection circuitry;

verifying the data transmission mode of the connected device using the combined findings of the first and second detection circuitries; and connecting the first or second communication circuitry, corresponding to the verified data transmission mode, to the first and second data lines of the common transmission path to allow for data transmission between the connected electronic device and a further electronic device in said verified data transmission mode using the same interface.

2. An interface according to claim 1, wherein said first and second data lines are configured to be used to transmit and receive data using said second mode of data transmission.

3. An interface according to claim 1, wherein said first data line is configured to be used to receive data and said second data line is configured to be used to transmit data using said first mode of data transmission.

4. An interface according to claim 1, wherein said first data line is configured to be used to receive and transmit data using said first mode of data transmission.

5. An interface according to claim 1, wherein said second data line is configured to be used to receive and transmit data using said first mode of data transmission.

6. An interface according to claim 1, wherein said first and second data lines are configured to be connectable to a data bus.

7. An interface according to claim 1, wherein the USB port conforms to a B-type USB specification.

8. An interface according to claim 1, wherein the first mode of data transmission uses a first set of voltage levels.

9. An interface according to claim 8, wherein the second mode of data transmission uses a second, different set of voltage levels.

10. An interface according to claim 9, wherein said switching circuitry comprises circuitry for shifting the first and second set of voltage levels to another set of voltage level.

11. An interface according to claim 1, wherein said first communication circuitry is configured for full-duplex communication.

12. An interface according to claim 1, wherein said first communication circuitry is configured for half-duplex communication.

13. An electronic device including an interface according to claim 1.

14. An interface according to claim 1, wherein the first and second lines are configured to be used for data transmission to/from two different devices.

15. An interface according to claim 1 wherein the interface is configured such that one of said first and second data lines is used only to receive data and the other of said first and second data lines is used only to transmit data using said first data transmission mode, and wherein each of said first and second data lines is used both to transmit and receive data using said second data transmission mode.

16. An interface according to claim 1, wherein the first data line is configured to be used for half-duplex data transmission between the electronic device and a first connected device and the second data line is configured to be used for half-duplex data transmission between the electronic device and a second, different connected device.

17. An interface according to claim 1, wherein the USB port is configured to be used without the need for an adapter.

18. An ASIC comprising an interface according to claim 1.

19. A method comprising:

selectively connecting first or second communication circuitry of a communication interface to a common transmission path to enable an electronic device connected to a USB ort of the communication interface to be in communication with a further electronic device, the communication to be enabled using either:

a first data transmission mode, comprising single-ended asynchronous data transmission, the first communication circuitry being configured to allow for communication between a connected electronic device and a further electronic device using said first data transmission mode; or a second data transmission mode, comprising USB differential transmission of data, the second communication circuitry being configured to allow for communication between a connected electronic device and a further electronic device using said second data transmission mode, wherein the USB port is configured to be able to receive a data bus of an electronic device to be connected to the communication interface, the USB port including:

a power Vbus line;

a data transmission mode status line;

a ground line; and a first and second data line for receiving data from an electronic device connected to interface via the USB port, wherein the first and second data lines form part of the common transmission path to enable communication between the devices across the interface, wherein selectively connecting the first or second communication circuitry comprises:

identifying the data transmission mode status of an electronic device connected to the interface using the data transmission mode status line of the USB port;

identifying the power activity of the connected electronic device using the second detection circuitry using the power Vbus line of the USB port;

verifying the data transmission mode of the connected device using the combined findings of the identifying steps; and performing switching to selectively connect the first or second communication circuitry, corresponding to the verified data transmission mode, to the first and second data lines of the common transmission path to allow for data transmission between the connected electronic device and a further electronic device in said verified data transmission mode using the same interface.

* * * * *

UNITED STATES PATENT AND TRADEMARK OFFICE
CERTIFICATE OF CORRECTION

| | | |
|---|---|---|
| PATENT NO. | : 7,870,319 B2 | Page 1 of 1 |
| APPLICATION NO. | : 12/462860 | |
| DATED | : January 11, 2011 | |
| INVENTOR(S) | : Croyle et al. | |

It is certified that error appears in the above-identified patent and that said Letters Patent is hereby corrected as shown below:

Claim 19, col. 8, line 21 delete "ort" and insert --port--.

Signed and Sealed this
Fifth Day of April, 2011

David J. Kappos
*Director of the United States Patent and Trademark Office*